Figure 1:
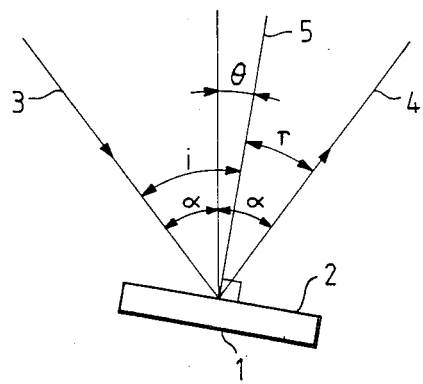

United States Patent [19]
Wilson

[11] Patent Number: 4,613,233
[45] Date of Patent: Sep. 23, 1986

[54] SINE BAR MECHANISM AND MONOCHROMATOR AND SPECTROPHOTOMETER INCLUDING SUCH A SINE BAR MECHANISM

[75] Inventor: James B. Wilson, Royston, England

[73] Assignee: U.S. Philips Corporation, New York, N.Y.

[21] Appl. No.: 585,066

[22] Filed: Mar. 1, 1984

[30] Foreign Application Priority Data

Mar. 2, 1983 [GB] United Kingdom ................. 8305744

[51] Int. Cl.[4] ............................. G01J 3/18; G01J 3/06
[52] U.S. Cl. ....................................... 356/328; 356/334
[58] Field of Search ................................ 356/328, 334

[56] References Cited

FOREIGN PATENT DOCUMENTS 227141 7/1958 Australia ............................ 356/334

0138224 10/1981 Japan ................................. 356/334

Primary Examiner—Vincent P. McGraw
Attorney, Agent, or Firm—Paul R. Miller

[57] ABSTRACT

A sine bar mechanism comprises an arm of radius R pivoted about an axis which is also the axis of a diffraction grating. An elongated member is pivotally mounted at one end, and is pivotally connected to the arm at its other end. The coordinates of the point at the pivotal mounting at one end of the member and the length of the elongated member are chosen to optimize the characteristics of the mechanism. Embodiments in which the elongated member comprises a lead screw and the pivotal connection comprises a nut pivotally attached to the arm and engaging the lead screw are described and their use in various types of monochromators are portrayed.

13 Claims, 11 Drawing Figures

SINE BAR MECHANISM AND MONOCHROMATOR AND SPECTROPHOTOMETER INCLUDING SUCH A SINE BAR MECHANISM

The invention relates to a sine bar mechanism for rotating a diffraction grating in a monochromator with the sine bar mechanism comprising an arm mounted to be rotatable about a pivot, the arm carrying the diffraction grating, and means for rotating the arm about the pivot. The invention further provides a monochromator and a spectrophotometer including such a sine bar mechanism.

Sine bar mechanisms are used in monochromators to rotate a diffraction grating in a monochromator in such a way that a linear change of wavelength at the output of the monochromator is obtained for a linear input to the mechanism. A sine bar mechanism typically comprises a push rod which is advanced by a screw mechanism and which bears on an arm which carries the diffraction grating and which is mounted for rotation about a pivot. Such mechanisms are constructed from components which are manufactured to very high accuracy and which are therefore correspondingly expensive.

It is an object of the invention to provide a sine bar mechanism using less expensive components.

The invention provides a sine bar mechanism as described in the opening paragraph characterised in that the means for rotating the arm about the pivot comprises an elongate member pivotally connected at one end to the arm and pivotally mounted at or adjacent to the other end and means for varying the distance between the pivotal mounting and the pivotal connection.

In a construction particularly suited for use in monochromators in which the diffraction grating is pivoted about an axis passing through its center, such as Ebert, Littrow, and Czerny-Turner monochromators, the diffraction grating may be mounted so that its center line passes through the pivot about which the arm rotates.

The elongate member may comprise a lead screw and the pivotal connection may comprise a nut which engages with the lead screw and which is pivotally connected to the arm. The lead screw may be rotated by a motor.

The position of the pivotal mount may be adjustable. This enables the effects of any inaccuracy in the length of the arm to be compensated for.

In order to reduce the errors introduced by backlash between the threaded shaft and the pivotted nut an anti-backlash arrangement may be provided with the anti-backlash arrangement comprising a helical spring surrounding the threaded shaft and maintained in compression between the pivotally mounted nut and a further nut on the shaft, means being provided to maintain a substantially constant compressive force in the spring.

The invention further provides a monochromator including such sine bar mechanisms and a spectrophotometer including such a monochromator.

The invention still further provides a Gillieson monochromator in which the diffraction grating is mounted on the arm in such a position that its motion describes the arc of a circle when the arm is rotated and in which the length of the arm, the position of the pivotal mounting, and the distance between the pivotal mounting and the pivotal connection are chosen to at least partially compensate for errors from a true sine law introduced by the motion of the diffraction grating along the arc of a circle.

Figure 2:
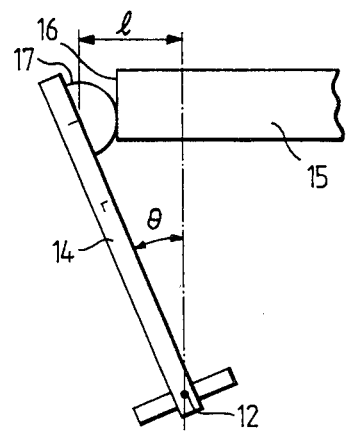
Figure 3:
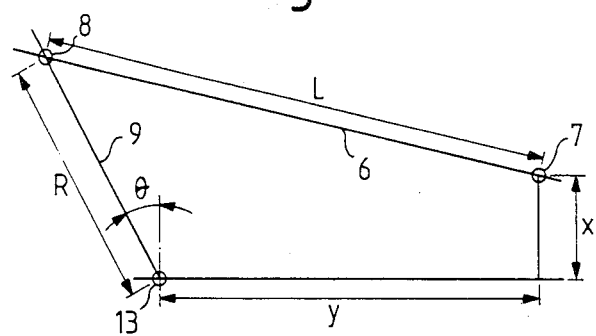
Figure 4:
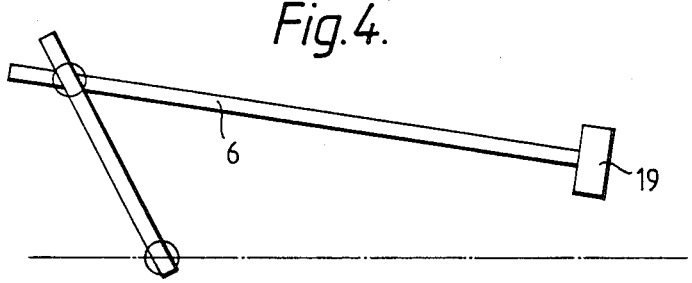
Figure 5:
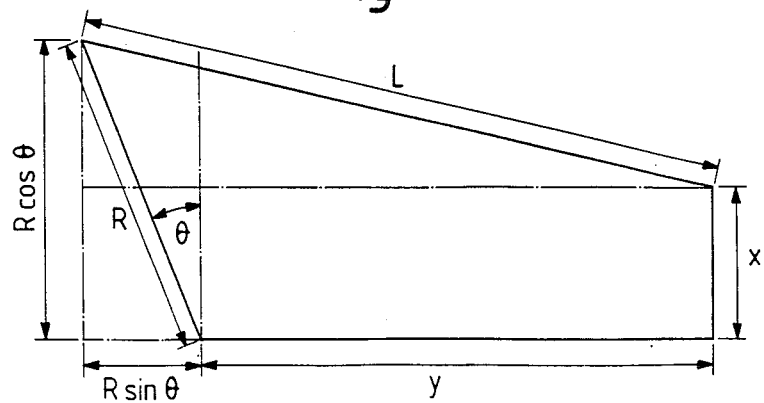
Figure 6:
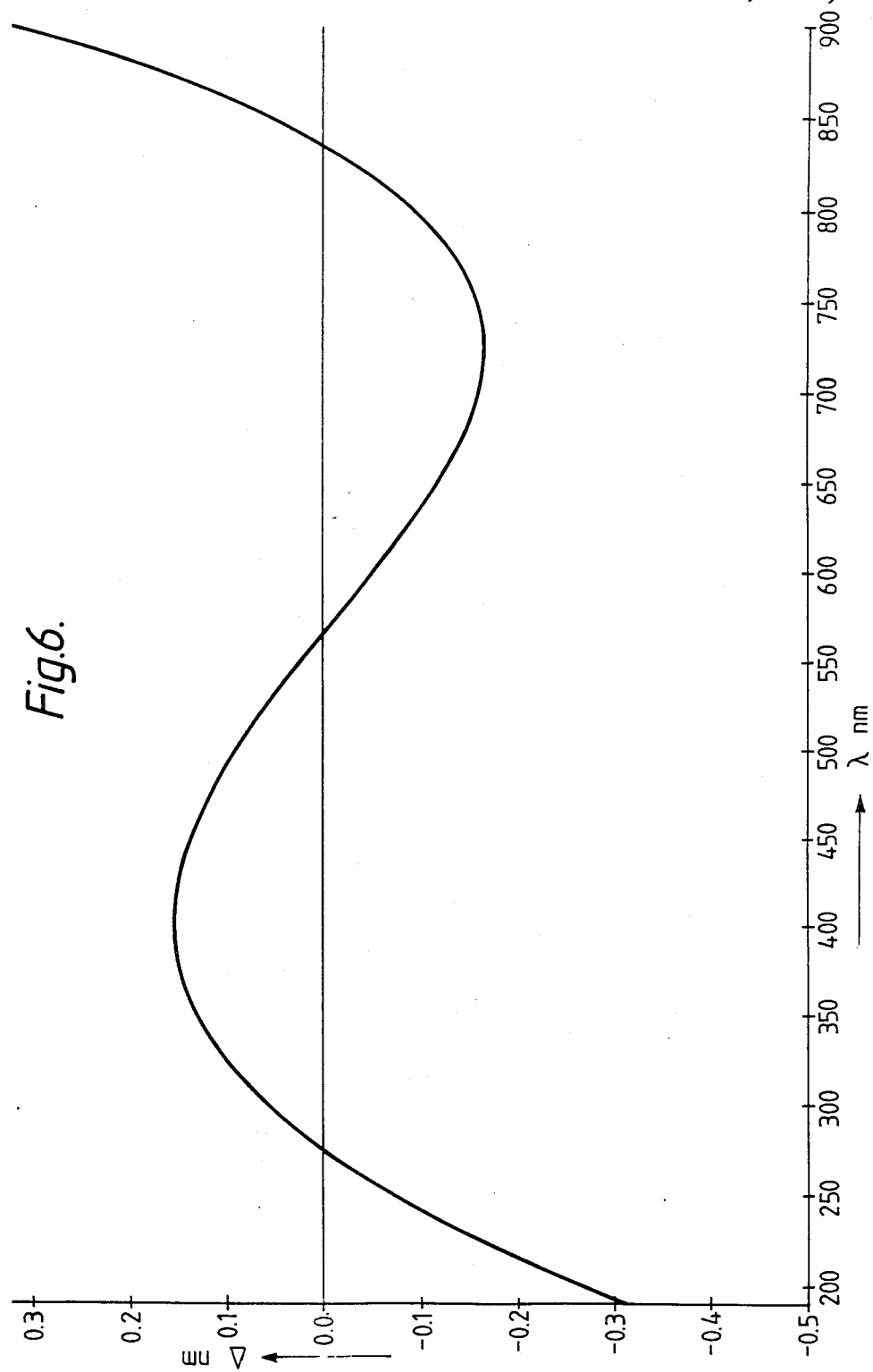
Figure 7:
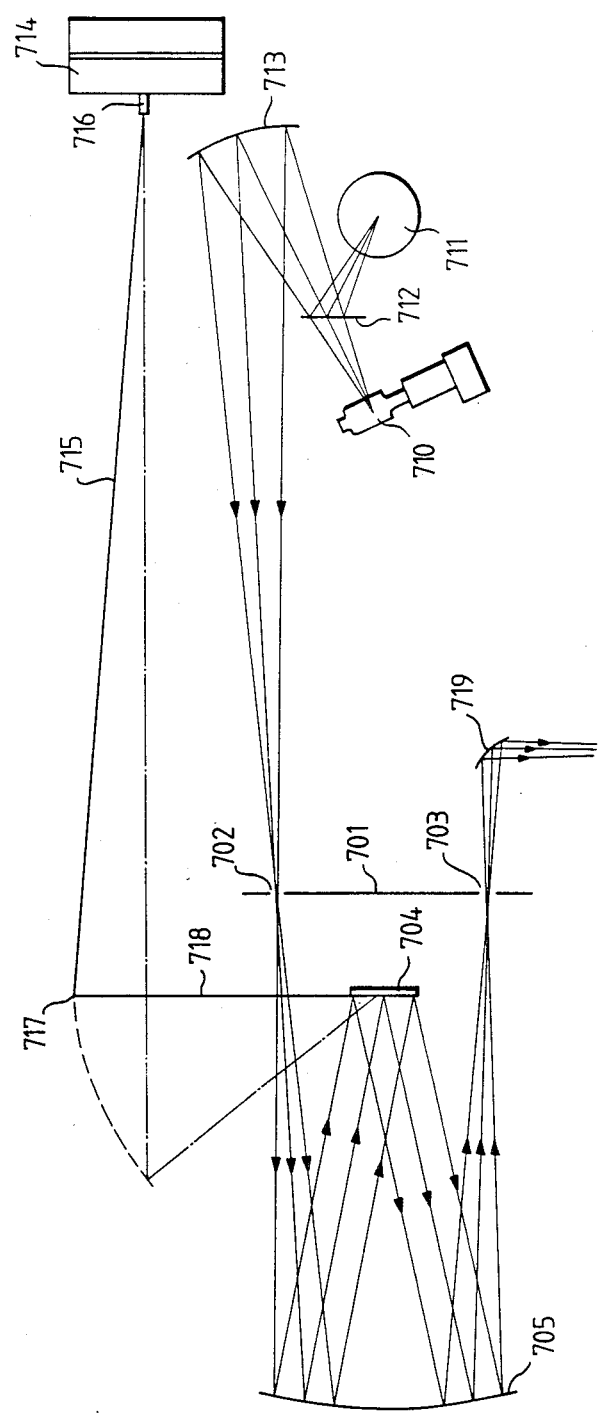
Figure 8:
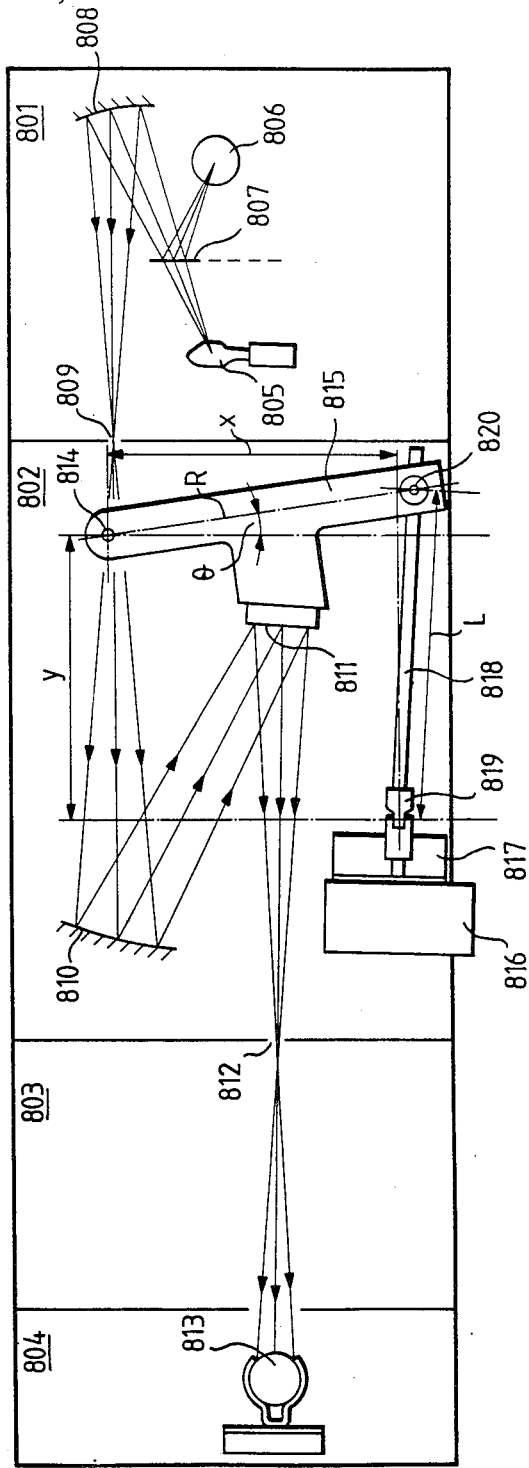
Figure 9:
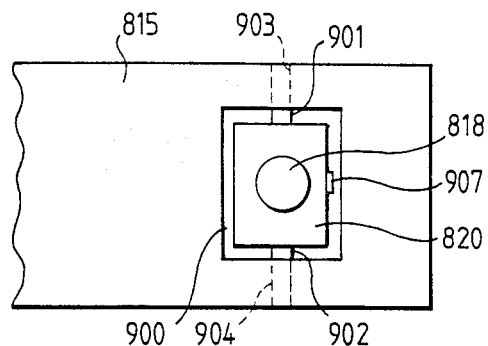
Figure 10:
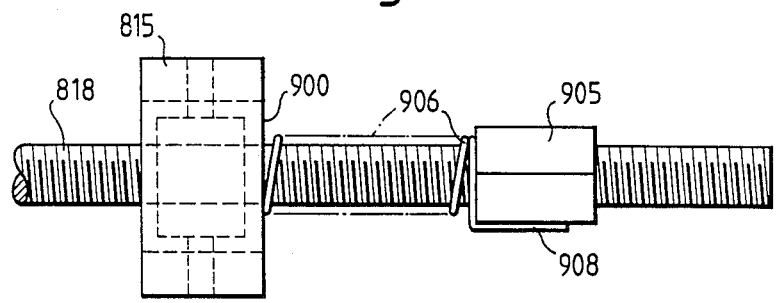
Figure 11:
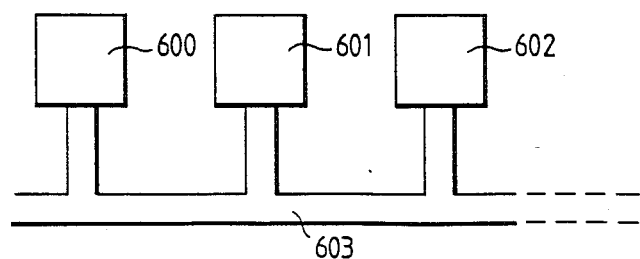

Embodiments of the invention will now be described, by way of example, with reference to the accompanying drawings, in which FIG. 1 shows diagrammatically a diffraction grating and incident and diffracted rays of radiation, FIG. 2 shows diagrammatically a prior art sine bar mechanism, FIG. 3 shows diagrammatically a sine bar mechanism according to the invention, FIG. 4 shows an arrangement of the sine bar mechanism of FIG. 3, FIG. 5 shows the geometrical layout of the sine bar mechanism of FIG. 3, FIG. 6 shows a deviation of a sine bar mechanism according to the invention from a true sine law, FIG. 7 shows a sine bar mechanism according to the invention used in an Ebert Monochromator, FIG. 8 shows a spectrophotometer using a sine bar mechanism according to the invention in a Gillieson Monochromator, FIGS. 9 and 10 show on an enlarged scale and in greater detail a pivot arrangement in a sine bar mechanism according to the invention, and FIG. 11 is a block schematic diagram of a stepper motor drive circuit for use in a sine bar mechanism according to the invention.

FIG. 1 shows a diffraction grating 1 having an active face 2 on which grooves are formed, an incident ray 3, a refracted ray 4 and the grating normal 5 together with incident angle i, diffracted angle r for wavelength $\lambda$.

The well known equation which relates the incident and diffracted rays is $$n\lambda = d(\sin i - \sin r) \qquad (1)$$

where $\lambda$ is the wavelength of the radiation
  n is the order of diffraction
  d is the spacing of the grooves on the diffraction grating
  i is the incident angle relative to the grating normal for the incident radiation
  r is the diffracted angle relative to the grating normal for radiation of wavelength $\lambda$.

One common arrangement in monochromators is to rotate the diffraction grating to alter the wavelength selected, keeping the angle $2\alpha$ between the incident and diffracted rays constant, so that $$2\alpha = i + r \qquad (2)$$

Substituting equation (2) in equation (1) gives $$n\lambda = 2d \cos \alpha \sin \theta \qquad (3)$$

where $2\theta = i - r$ and $\theta$ = the angle of rotation of the grating from the zero order spectrum position when $\lambda = 0$.

From equation (3) it can be seen that the wavelength is proportional to the sine of the angle of the grating rotation.

In order to provide a linear change of wavelength a mechanism which converts a linear movement into a rotational movement such that the linear movement is proportional to the sine of the angle of rotation is required. Such mechanisms are generally known as sine bars.

A typical sine bar mechanism is shown diagrammatically in FIG. 2. The diffraction grating 1 is mounted for rotation about an axis 12 perpendicular to the plane of the drawing, the rotational drive being provided by an arm 14 which is caused to rotate through an angle $\theta$ by linear movement 1 of an elongate member in the form of a push rod 15 which bears on the arm 14.

If 1 is the movement of the push rod 15 and r is the length of the arm 14 between the axis 12 and the end 16 of the push rod 15 then $$1 = r \sin \theta \tag{4}$$

Combining equations (3) and (4) gives $$n\lambda = 2d \cos\alpha \frac{1}{r} \tag{5}$$

or for a first order spectrum where n=

$$\lambda = 2d \cos\alpha \frac{1}{r} \tag{6}$$

Hence the wavelength $\lambda$ is proportional to the push rod travel 1.

The sine bar mechanism is typically constructed using a very accurate screw to advance the push rod 15, the length 1 being proportional to the screw rotation. Such a mechanism requires the screw push rod to be mounted in very accurately aligned and stable bearings and to have a very flat end face to bear against the arm. A ball bearing 17 is often mounted on the arm 14 to contact the push rod end face in a reproducible manner. This ball bearing has to be an accurate sphere, the push rod travel 1 and radius r being measured to the center of the ball. Conventional sine bar mechanisms have therefore demanded high accuracy, and therefore expensive, components.

A typical practical example is as follows:

| Monochromator wavelength range | 190–900 nms. |
|---|---|
| Diffraction Grating | 1200 grooves/mm. |
| $\lambda/1$ | 19.2 nm/mm. |
| $\alpha$ | 11.486° |

Using equation (6) the radius of the arm 4

$$r = 2d \cos\alpha \frac{1}{\lambda}$$

$$= 85.067 \text{ mm.}$$

If the required wavelength accuracy is ±0.1 nm then the length of the arm 1 must be accurate to $$\pm 85.067 \times \frac{0.1}{900} = \pm 0.009 \text{ mm.}$$

If the screw travel is 1 mm/19.2 nm wavelength change then the end face 16 of the push rod 15 must be square and flat to $$\pm \frac{0.1}{19.2} = \pm 0.005 \text{ mm.}$$

A mechanism which can produce a wavelength selection to an accuracy of ±0.4 nm over the range 190–900 nms and ±0.2 nm over the range 220–870 nms without using high accuracy components is chosen diagrammatically in FIGS. 3 to 5.

As shown in FIG. 3 a pivot 7 is placed at co-ordinates x and y from the axis 13 of the diffraction grating 1. Another pivot 8 is placed on the arm 9 at a radius R from the axis 13. The drive rod 6 extends between the two pivots 7 and 8 and has a length L which can be varied by sliding the rod 6 on either of the pivots 7 or 8. This arrangement gives a close approximation to the performance of a conventional sine bar mechanism when the dimensions are optimised.

FIG. 4 shows an arrangement where the pivot 7 is formed by the mounting for a stepper motor 19, while the elongate member comprises a threaded rod 6. The arm carries a pivotted nut which engages with the threaded rod 6 to form the pivot 8. The number of stepping pulses applied to the motor 19 can then be used as an indication of the incremental change in length of the rod 6 between the pivots 7 and 8.

The geometry of the arrangement is shown in FIG. 5. From FIG. 5 it can be seen that $$L^2 = (y + R \sin \theta)^2 + (R \cos \theta - x)^2 \tag{7}$$

For a conventional sine bar mechanism $$1 = r \sin \theta \tag{8}$$

If at a given angle $\theta o$ the length of the push rod 6 is $1o$ then, $$1o = r \sin \theta o \tag{9}$$

Hence the push rod travel is given by $$1 - 1o = r(\sin \theta - \sin \theta o) \tag{10}$$

Similarly for the approximate sine bar mechanism shown in FIGS. 3 to 5 the push rod travel for the angle of rotation of the diffraction grating is given by $$L - Lo = \{(y + R \sin \theta)^2 + (R \cos \theta - x)^2\}^{\frac{1}{2}} - \{(y + R \sin \theta o)^2 + (R \cos \theta o - x)^2\}^{\frac{1}{2}} \tag{11}$$

The error of the approximate sine bar $\Delta L$ is then given by $$\Delta L = (L - Lo) - (1 - 1o) \tag{12}$$

From equation (6) the corresponding wavelength error can be written as $$\Delta\lambda = 2d \cos\alpha \frac{\Delta L}{R} \tag{13}$$

Also from equation (3)

$$\sin \theta = \frac{\lambda}{2d \cos\alpha} \text{ and } \sin \theta o = \frac{\lambda o}{2d \cos\alpha} \tag{14}$$

Substituting equations (13) and (14) in equations (11) and (12) gives $$\Delta\lambda = \left\{ \left( \frac{y}{r} 2d\cos\alpha + \frac{R}{r} \lambda \right)^2 + \right. \tag{15}$$

-continued $$\left(\frac{R}{r}((2d\cos\alpha)^2 - \lambda^2)^{\frac{1}{2}} - \frac{2d\cos\alpha}{r}x\right)^2\right\}^{\frac{1}{2}} -$$

$$\left\{\left(\frac{y}{r}2d\cos\alpha + \frac{R}{r}\lambda_o\right)^2 + \right.$$

$$\left(\frac{R}{r}((2d\cos\alpha)^2 - \lambda_o^2)^{\frac{1}{2}}\frac{2d\cos\alpha}{r}x\right)^2\right\}^{\frac{1}{2}} - (\lambda - \lambda_o)$$

$$\left.\begin{array}{l}\text{Let } A = \frac{y}{r}2d\cos\alpha \\ B = 2d\cos\alpha \\ x = \frac{R}{r} \\ y = \frac{2d\cos\alpha}{r}x\end{array}\right\} \quad (16)$$

Then substituting (16) in (15)

$$\Delta\lambda = \{(A + x\lambda)^2 + (x(B^2 - \lambda^2)^{\frac{1}{2}} - Y)^2\}^{\frac{1}{2}} - \qquad (17)$$

$$\{(A + x\lambda_o)^2 + (x(B^2 - \lambda_o^2)^{\frac{1}{2}} - Y)^2\}^{\frac{1}{2}} - (\lambda - \lambda_o)$$

The sine bar radius r is determined by the groove spacing d on the diffraction grating, the angle $\alpha$, and the rate of change of wavelength with length of push rod $$\frac{\Delta L}{\Delta\lambda}$$

as can be seen from equation (13) when re-arranged to give $$r = 2d \cos\alpha \frac{\Delta L}{\Delta\lambda} \qquad (18)$$

If the base length y is chosen to be a convenient size to fit in the instrument in which the monochromator is to be used then the equation (17) defining the wavelength error contains three unknown factors X, Y and $\lambda_o$. It is possible using standard mathematical computer optimisation techniques to determine the optimum values of X, Y, and $\lambda_o$, and hence R, x, and $\Omega_o$ to minimise the mean square of the error over the required wavelength range or alternatively to minimise the maximum error.

In one embodiment the following parameters were initially defined.
(1) Diffraction grating 1200 lines/mm.
(2)

$$\frac{\Delta\lambda}{\Delta L} 19.2 \text{ nm/mm}$$

(3) Wavelength range 190–900 nm
(4) Base length y 300 mm
(5) Angle $\alpha$ 11.486°
After optimisation the following values were obtained for R, x and $\lambda_o$
R=86.150 mm
x=68.857 mm
$\lambda_o$=273.538 nm The wavelength error for this particular arrangement over the specified range of wavelengths is shown in FIG. 6.

This arrangement eliminates the requirements for a precision sphere to contact the end of the push rod, for a perfectly flat ground end on the push rod, and for a precision alignment of the end face of the push rod with the active face of the diffraction grating in the zero order position. Further by making the pivotal mounting adjustable and hence the dimension x variable any errors in the dimension R i.e. the length of the arm, may be compensated for.

FIG. 7 shows diagrammatically the application of the sine bar mechanism to an Ebert Monochromator. The monochromator comprises a slit plate 701 defining an entrance slit 702 and an exit slit 703. A diffraction grating 704 is mounted to pivot about an axis perpendicular to the plane of the drawing and passing through the mid point of the grating. A concave mirror 705 produces a collimated beam of radiation from the radiation passing through the entrance slit 702 and directs the collimated beam onto the diffraction grating 704. The diffracted beam is again reflected from the collimating mirror 705 which brings the diffracted beam to a focus at the exit slit 703.

When the monochromator is used in a spectrophotometer a source of radiation which contains all the wavelengths to which the monochromator is to be tuned is required. In the example given hereinbefore the wavelength range extends from the near infra red through the visible to the ultra violet regions of the spectrum. A tungsten filament lamp 710 provides the near infra red and visible radiation while a deuterium lamp 711 provides the ultra violet radiation, the appropriate lamp being selected by a mirror 712 which can be moved between two positions and allow radiation from the selected lamp to fall on a concave mirror 713 which focusses the radiation beam on the entrance slit 702.

A stepper motor 714 drives a threaded shaft 715 via a pivotted joint 716. The shaft 715 is pivotally connected 717 to an arm 718 on which the diffraction grating 704 is mounted. The pivotal connection 717 comprises a nut which is pivotally mounted on the arm 718 and which runs on the threaded shaft 715. As a result stepping of the motor 714 will rotate the shaft 715 causing the nut to travel along the shaft and the pivotal connection to progress along the shaft. The arm 718 then rotates through an angle $\theta$ causing the diffraction grating 704 to be rotated through the angle $\theta$. The radiation output from the output slit 703 of the monochromator is reflected by a concave mirror 719 and passes through a sample compartment to a detector (not shown).

In the arrangement shown in FIG. 7 the length of the shaft 715 between the pivots 716 and 717 is equivalent to the length L in FIG. 5, the length of the arm 718 is equivalent to the length R, the distance parallel to the optical axis 720 between the pivot 716 and the diffraction grating 704 is equivalent to the dimension y and the perpendicular distance from the optical axis of the pivot 716 is equivalent to the dimension x.

FIG. 8 shows the application of the approximate sine bar mechanism in a spectrophotometer having a Gillieson Monochromator. The spectrophotometer comprises a first section 801 which includes a source of radiation, a second section 802 housing the monochromator, a third section 803 in which the sample to be analysed is placed, and a fourth section 804 which includes a radiation detector.

The spectrophotometer shown includes a tungsten filament lamp 805 and a deuterium lamp 806 to enable a wavelength range which covers both the visible and ultra violet regions of the spectrum to be covered. A mirror 807 is movable between a first position (as shown) in which radiation from the deuterium lamp 806 is reflected onto a concave mirror 808 and a second position (shown dotted) in which radiation from the tungsten lamp 805 is allowed to fall on the concave mirror 808.

Radiation reflected from the concave mirror 808 is focussed on an entrance slit 809 of the monochromator 802 and passes through the entrance slit to fall onto a concave mirror 810. The radiation is reflected by the mirror 810 as a converging beam onto a diffraction grating 811 where it is diffracted and focussed on an exit slit 812 of the monochromator 802. The radiation then passes through the sample compartment 803 and falls on a detector 813 which may, for example be in the form of a photomultiplier tube or a vacuum photo tube in the fourth section 804. The electrical output of the detector 813 is fed to processing circuitry (not shown) which converts it into suitable form for display. In order to select a required wavelength of radiation passing through the sample compartment 803 the diffraction grating is rotated about an axis perpendicular to the plane of the drawing and passing through the center of a pivot 814. This is achieved by rotating the arm 815 which carries the grating 811 about the pivot 814.

A stepper motor 816 is mounted on a bracket 817 in the monochromator 802 and its output is coupled to a threaded shaft 818 by a universal joint 819. A nut 820 is pivotally mounted in an aperture in the arm 815 and rides on the shaft 818. Thus as the motor 816 steps the shaft 818 rotates and the nut 820 advances along the threaded shaft causing the arm 815 to rotate about the pivot 814.

The radiation beam passes over the top of the pivot 814 but is broken in FIG. 8 to enable the pivot point to be seen more clearly. It is, of course, necessary to arrange the entrance and exit slits, mirror 810 and diffraction grating 811 in appropriate orientation to be in the radiation path and to enable that path to pass over the pivot 814. The parameters x, y, R, L and $\theta$ corresponding to those shown in FIG. 5 are marked in FIG. 8 of the accompanying drawings. The parameter x may be made adjustable by making the position of the mounting bracket 817 adjustable or by making the position of the motor 816 adjustable on the bracket 817. It has been found that there is a ratio of approximately 8 to 1 between errors introduced by errors in the length of the arm 815(R) and the position of the pivotal mount (x). Thus a small error in R may be compensated by a larger adjustment of x in the appropriate direction.

Since the diffraction grating 811 moves along the arc of a circle instead of in a straight line an error in the sine law is produced. This error can be minimised by suitable choice of x, y, R and L, the error in the sine bar mechanism being made opposite to that caused by the movement of the diffraction grating in an arc.

FIGS. 9 and 10 show the pivotable joint between the arm 815 and the shaft 818 in greater detail and on an enlarged scale. The nut 820 is pivotally mounted in an aperture 900 in the arm 815 by means of bearings 901, 902 in seats 903, 904. Thus as the shaft 818 rotates the nut 820 travels along the shaft and pivots in the aperture 900. In order to minimise the backlash between the nut 820 and the shaft 818 a second nut 905 is threaded on the shaft 818 and a helical spring 906 surrounds the shaft between the first nut 820 and the second nut 905. The spring 906 is kept in compression and thus urges the nut 820 against one side of the thread. Tangs 907 and 908 are located against flats on the nuts 820 and 905 to prevent the nut 905 from rotating on the shaft 818 and thus keeping a constant distance between the two nuts and hence maintaining a constant compressive force on the spring.

FIG. 11 shows block schematically an arrangement for driving the stepper motor 9 or 816. The arrangement comprises a microprocessor 600, a read only memory (ROM) 601, and a drive circuit 602 which intercommunicate via a highway 603. The microprocessor 601 produces a drive signal which is applied to the drive circuit 602 which provides the waveforms required to be applied to the coils of the motor to cause it to step. If it is required to scan the waveband at a given rate the microprocessor can be arranged to produce a clock waveform at the appropriate rate and to apply that clock waveform to the drive circuit 602. In that case the drive circuit 603 could take the form of that described in U.K. Patent Application No. 2043879A, corresponding to U.S. Pat. No. 4,305,663, with the microprocessor 601 merely supplying clock pulses to the drive circuit at the appropriate rate. Alternatively the microprocessor 601 could generate the stepping pulses directly, in which case the drive circuit 603 would consist merely of driver circuits to convert the voltage and current of the pulses to that required to drive the motor coils.

In order to increase the linearity of the scan the inverse of the characteristic shown in FIG. 6 may be stored in a memory such as the ROM 602 and used by the microprocessor to correct the error. For example, to set the monochromator to a particular wavelength a corrected number of pulses required to step the motor from a reference position, for example that corresponding to the zero order position of the diffraction grating, to a given wavelength setting can be stored. The microprocessor may be arranged to count the number of pulses from the zero order position and may, for example, produce ten stepping pulses for every one nanometer of wavelength change. The memory may then store corrections at given wavelengths so that either nine or eleven steps are made equivalent to a one nanometer change in, wavelength with the microprocessor tracking the wavelength to which the monochromator is set.

Various modifications may be made to the embodiments shown. For example, the motor may be a d.c, pulsed d.c, or a.c. motor with appropriate modifications to the drive circuit, alternative forms of pivot may be used for the pivotted nut, the arm pivot and the threaded shaft; instead of a universal joint between the motor and the threaded shaft a direct connection may be made with the motor mounted so as to be pivotable; the sine bar mechanism could be used in other types of monochromator, for example a Littrow or Czerny-Turner monochromator or monochromators using non-planar diffraction gratings such as the concave grating of a Seya monochromator; instead of using a threaded shaft for the elongate member a rod pivoted to the arm and extendable by a linear actuator may be used.

I claim:

1. A sine bar mechanism for rotating a diffraction grating in a monochromator, said sine bar mechanism comprising:
    an arm carrying a diffraction grating, said arm being rotatable about a first pivot, an elongated member pivotally connected to said arm at one end of said member, said member being pivotally mounted at least adjacent to the other end of said member with the pivotal mounting being fixed in position relative to said first pivot of said arm, and first means for varying the distance between the pivotal connection at said one end of said member and said pivotal mounting adjacent said other end of said member in order to cause rotation of said arm about said first pivot.

2. A sine bar mechanism according to claim 1, wherein said diffraction grating is mounted with a center axis passing through said first pivot.

3. A sine bar mechanism according to claim 1 or claim 2, wherein said elongated member comprises a lead screw, and said pivotal connection comprises a nut engaging said lead screw, said nut being pivotally connected to said arm.

4. A sine bar mechanism according to claim 3, wherein said lead screw is rotated by one of a stepper motor or a pulse driven d.c. motor.

5. A sine bar mechanism according to claim 3, wherein an anti-backlash arrangement is provided for said elongated member, said arrangement including a helical spring surrounding said lead screw, a further nut on said lead screw, and means for maintaining a substantially constant compressive force in said helical spring, said helical spring being maintained in compression between said pivotal connection and said further nut.

6. In a monochromator comprising a source of radiation, a sine bar mechanism for rotating a diffraction grating receiving said radiation, and output means for providing diffracted radiation, the improvement comprising said sine bar mechanism including an arm carrying said diffraction grating, said arm being rotatable about a first pivot; an elongated member pivotally connected to said arm at one end of said member, said member being pivotally mounted at least adjacent to the other end of said member with the pivotal mounting being fixed in position relative to said first pivot of said arm; and first means for varying the distance between the pivotal connection at said one end of said member and said pivotal mounting adjacent said other end of said member in order to cause rotation of said arm about said first pivot.

7. A monochromator according to claim 6, wherein said diffraction grating is mounted on said arm at a position to move in the arc of a circle when said arm is rotated, and wherein the length of said arm, the position of said pivotal mounting, and the distance between said pivotal mounting and said pivotal connection are provided to at least partially compensate for errors from a true sine law introduced by motion of said diffraction grating along said arc of said circle, such that a Gillieson monochromator is provided.

8. A monochromator according to claim 6 or claim 7, wherein said elongated member comprises a lead screw, and said pivotal connection comprises a nut engaging said lead screw, said nut being pivotally connected to said arm.

9. A monochromator according to claim 8, wherein an anti-backlash arrangement is provided for said elongated member, said arrangement including a helical spring surrounding said lead screw, a further nut on said lead screw, and means for maintaining a substantially constant compressive force in said helical spring, said helical spring being maintained in compression between said pivotal connection and said further nut.

10. In a spectrophotometer comprising a first section providing a source of radiation, a second section having a monochromator with a sine bar mechanism, a third section providing a sample to be analyzed, and a fourth section providing a radiation detector, the improvement comprising said sine bar mechanism including an arm carrying a diffraction grating, said arm being rotatable about a first pivot; an elongated member pivotally connected to said arm at one end of said member, said member being pivotally mounted at least adjacent to the other end of said member with the pivotal mounting being fixed in position relative to said first pivot of said arm; and first means for varying the distance between the pivotal connection at said one end of said member and said pivotal mounting adjacent said other end of said member in order to cause rotation of said arm about said first pivot.

11. A spectrophotometer according to claim 10, wherein said diffraction grating is mounted on said arm at a position to move in the arc of a circle when said arm is rotated, and wherein the length of said arm, the position of said pivotal mounting, and the distance between said pivotal mounting and said pivotal connection are provided to at least partially compensate for errors from a true sine law introduced by motion of said diffraction grating along said arc of said circle, such that a Gillieson monochromator is provided.

12. A spectrophotometer according to claim 10 or 11, wherein said elongated member comprises a lead screw, and said pivotal connection comprises a nut engaging said lead screw, said nut being pivotally connected to said arm.

13. A spectrophotometer according to claim 12, wherein an anti-backlash arrangement is provided for said elongated member, said arrangement including a helical spring surrounding said lead screw, a further nut on said lead screw, and means for maintaining a substantially constant compressive force in said helical spring, said helical spring being maintained in compression between said pivotal connection and said further nut.

* * * * *